United States Patent
Naderhirn et al.

(10) Patent No.: US 10,656,096 B2
(45) Date of Patent: May 19, 2020

(54) METHOD AND SYSTEM FOR INSPECTING A SURFACE AREA FOR MATERIAL DEFECTS

(75) Inventors: Michael Naderhirn, Linz (AT); Peter Langthaler, Linz (AT)

(73) Assignee: EADS Deutschland GmbH, Ottobrunn (DE)

(*) Notice: Subject to any disclaimer, the term of this patent is extended or adjusted under 35 U.S.C. 154(b) by 672 days.

(21) Appl. No.: 14/113,917

(22) PCT Filed: Apr. 26, 2012

(86) PCT No.: PCT/AT2012/050056
§ 371 (c)(1),
(2), (4) Date: Feb. 28, 2014

(87) PCT Pub. No.: WO2012/145780
PCT Pub. Date: Nov. 1, 2012

(65) Prior Publication Data
US 2014/0168420 A1 Jun. 19, 2014

(30) Foreign Application Priority Data
Apr. 26, 2011 (DE) ......... 10 2011 017 564

(51) Int. Cl.
*G01N 21/88* (2006.01)
*G01M 5/00* (2006.01)
(Continued)

(52) U.S. Cl.
CPC ............. *G01N 21/88* (2013.01); *F03D 17/00* (2016.05); *F03D 80/50* (2016.05); *G01C 11/02* (2013.01);
(Continued)

(58) Field of Classification Search
CPC ........ G01N 21/88; G01N 21/00; G01N 21/84; G01N 21/892
(Continued)

(56) References Cited

U.S. PATENT DOCUMENTS 4,818,990 A 4/1989 Fernandes
6,588,701 B2 7/2003 Yavnai
(Continued)

FOREIGN PATENT DOCUMENTS

CN 101604830 A 12/2009
DE 10 2005 002 278 A1 7/2006
(Continued)

OTHER PUBLICATIONS

International Search Report dated Oct. 15, 2012 with English translation (seven (7) pages).
(Continued)

*Primary Examiner* — Sath V Perungavoor
*Assistant Examiner* — Kristin Dobbs
(74) *Attorney, Agent, or Firm* — Crowell & Moring LLP

(57) ABSTRACT

A camera assembly arranged on an unmanned and autonomously navigating aerial vehicle is employed to inspect a surface area of for material defects. The vehicle is automatically flown to the surface area from a launch site, wherein it can fly around obstacles using automatic obstacle detection and avoidance methods. A relative position of the aerial vehicle with respect to the surface area with the aid of a position sensor is continuously measured and a sequence of images of the surface area is recorded. Between the individual images, the aerial vehicle is moved along a flight path overlapping image details of the surface area. The images of the sequence are composed into an overall image of the
(Continued)

Figure 1:
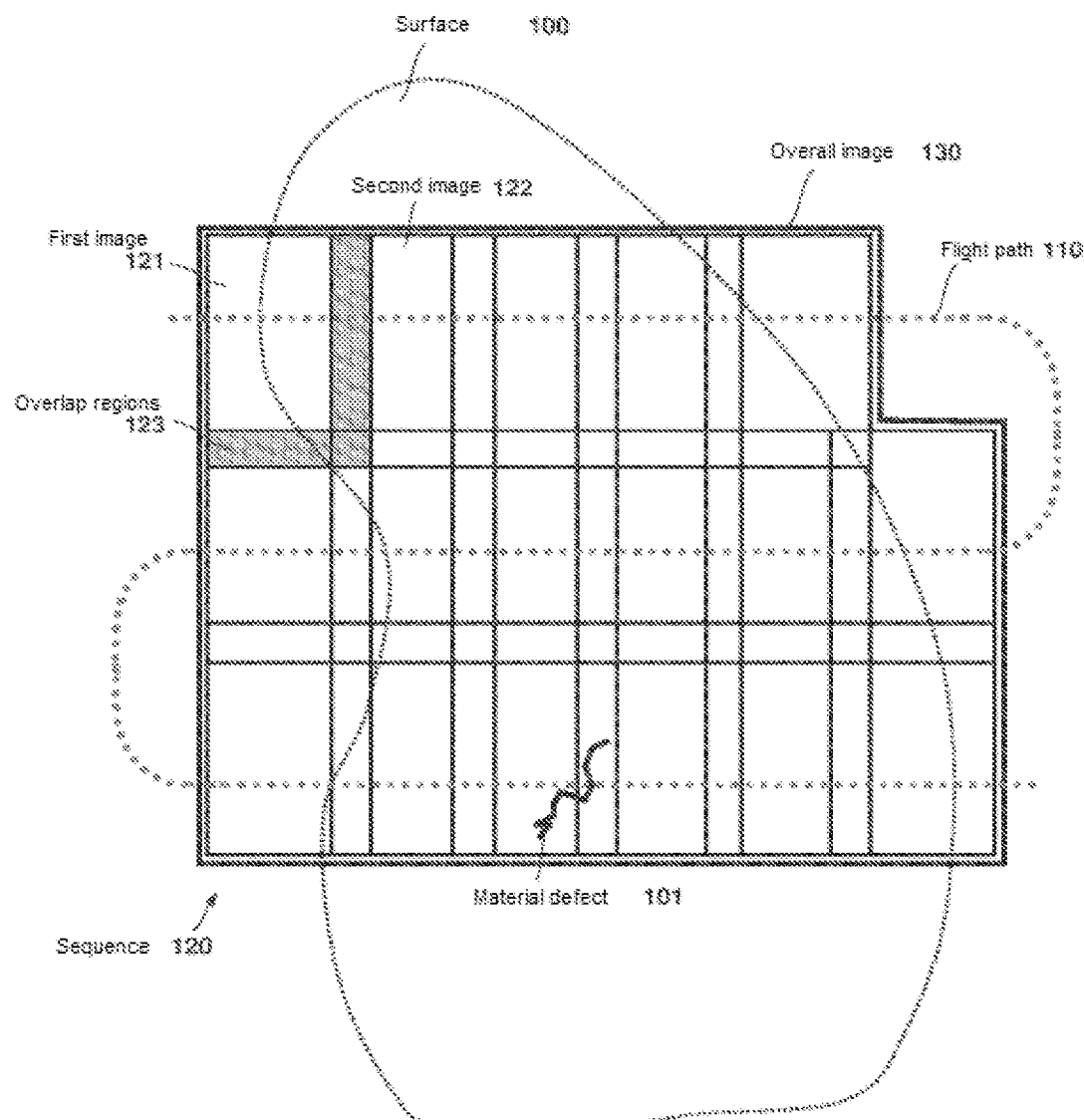

surface area to allow for the surface area to be inspected for defects and the location of defects to be ascertained on the basis of the overall image.

9 Claims, 5 Drawing Sheets

(51) Int. Cl.
    *G05D 1/00*         (2006.01)
    *G01C 11/02*       (2006.01)
    *F03D 17/00*       (2016.01)
    *F03D 80/50*       (2016.01)
    *G01N 25/72*       (2006.01)

(52) U.S. Cl.
    CPC ........ *G01M 5/0016* (2013.01); *G01M 5/0033* (2013.01); *G01M 5/0075* (2013.01); *G01M 5/0091* (2013.01); *G05D 1/0094* (2013.01); *B64C 2201/123* (2013.01); *B64C 2201/127* (2013.01); *B64C 2201/141* (2013.01); *G01N 25/72* (2013.01); *Y02B 10/30* (2013.01); *Y02E 10/72* (2013.01)

(58) Field of Classification Search
    USPC .......................................................... 348/128
    See application file for complete search history.

(56) References Cited

U.S. PATENT DOCUMENTS

| | | | |
|---|---|---|---|
| 8,482,455 B2* | 7/2013 | Kemkemian | G01S 13/003 342/107 |
| 2009/0279776 A1 | 11/2009 | Tirosh | |
| 2010/0103260 A1 | 4/2010 | Williams | |
| 2010/0245566 A1* | 9/2010 | Lev | G01N 21/95684 348/142 |
| 2011/0090110 A1 | 4/2011 | Tralshawala et al. | |
| 2012/0136630 A1* | 5/2012 | Murphy | F03D 1/003 702/188 |
| 2012/0262708 A1* | 10/2012 | Connolly | B64C 39/024 356/237.2 |

FOREIGN PATENT DOCUMENTS

| | | |
|---|---|---|
| DE | 601 19 462 T2 | 9/2006 |
| DE | 20 2008 015 324 U1 | 4/2010 |
| DE | 10 2008 053 928 A1 | 5/2010 |
| DE | 10 2010 046 493 B3 | 3/2012 |
| EP | 2 312 335 A1 | 4/2011 |
| JP | 11-132962 A | 5/1999 |
| JP | 2005-265699 A | 9/2005 |
| JP | 2008-247293 A | 10/2008 |
| WO | WO 2010/007115 A2 | 1/2010 |
| WO | WO 2011/064565 A2 | 6/2011 |

OTHER PUBLICATIONS

German-language Written Opinion (PCT/ISA/237) dated Oct. 15, 2012 (ten (10) pages).

German Office Action with partial English translation dated Jan. 30, 2012 (Fifteen (15) pages).

Vanetti, N. "Géolocalisation par photogrammétrie des désordres d'ouvrages d'art sur des images acquises par un drone d'hélicoptère", "Mémoire de soutenance de Diplôme d'Ingénieur INSA", Sep. 17, 2008, http://perso.lcpc.fr/sylvie.chambon/PUBLICATIONS/VanettiRapportMaster2008.pdf , accessed Jan. 25, 2012 (Eighty-five (85) pages).

Pluta, W. Prometheus: DLR baut eine zivile Forschungsdrohne, golem.de, Jun. 9, 2010. http://www.golem.de/1006/75684.html, accessed Jan. 25, 2012 (Seven (7) pages).

In: Wikipedia, Die freie Enzyklopaedie. Bearbeitungsstand: Jan. 22, 2012 23:41 UTC. http://de.wikipedia.org/wiki/Unbemanntes_Luftfahrzeug, accessed Jan. 23, 2012, (Nine (9) pages).

In: Siegener Zeitung, Ueber ewiges Eis und Solarkraftwerke, Feb. 6, 2010. http://www.microdrones.com/bilder/presse/artikel/sz_100206_microdrones.pdf, accesed Jan. 25, 2012, (One (1) page).

Database Inspec, The Institution of Electric Engineers, Stevenage, GB, 2007, Liu, Rui et al., "Real time fully automatic 3D-modelling of HRSC landscape data", XP002683176, Database accession No. 9702629, 2007 Urban Remote Sensing Joint Event Apr. 11-13, 2007 Paris France, Apr. 11, 2007, Urban Remote Sensing Joint Event IEEE, Piscataway, NJ, USA, (One (1) page).

European Office Action issued in European counterpart application No. 12 729 835.4-1001 dated Feb. 9, 2018 (Six (6) pages).

German Notice of Opposition issued in German counterpart application No. 10 2011 017 564 B4 dated Nov. 10, 2017 (Eleven (11) pages).

EADS-Dornier, "Sense & Avoid-Technologie fuer UAV's zur Vermeidung von Mid Air Collisions", Defence and Communication Systems—The EADS Systems House, Apr. 22, 2004, 14 total pages.

\* cited by examiner

METHOD AND SYSTEM FOR INSPECTING A SURFACE AREA FOR MATERIAL DEFECTS

BACKGROUND AND SUMMARY OF THE INVENTION

Exemplary embodiments of the present invention relate to a method and a system for automated inspection of a surface for material defects.

Material defects may have negative effects on the stability of components of structures such as bridge pillars or rotor blades of wind turbines. Material defects may propagate and lead to serious static impairments. The surfaces of such structures are therefore usually subjected to regular inspections, in particular visual inspections. In the case of surfaces that are difficult to reach and/or are at a great height (such as the blades of offshore wind turbines, for example), an inspection for material defects requires great effort because people must be lowered by cable from a great height to be able to reach the surfaces to be inspected, for example, and then to inspect them. The time required to do so is particularly important but the safety aspect is also significant.

Exemplary embodiments of the present invention are directed to a method and/or a system for inspecting surfaces for material defects, which will reduce the associated effort as well as the safety risk.

In accordance with exemplary embodiments of the present invention, a method and measurement system for inspecting a surface for material defects can be achieved using a camera configuration provided on an unmanned aircraft that is to be navigated autonomously are described below. According to one example of the invention, the method comprises the following steps: continuous measurement of a relative position of the aircraft with respect to the surface with the help of a position sensor, recording at least one image of the surface to permit an inspection (e.g., automated) of the at least one image for defects in the surface and to thereby detect and localize material defects in the surface.

In addition, a method and a measurement system for inspecting the surface of rotor blades of wind turbines for material defects by means of a camera configuration arranged on an unmanned, autonomously flying aircraft are described. According to one example of the invention, the method includes the following steps: continuous measurement of a relative position of the aircraft with respect to the surface of a rotor blade with the help of a position sensor, recording a sequence of images of the surface, with the aircraft moving along a flight path relative to the surface of the rotor blade between the individual images, so that neighboring images of the sequence represent at least partially overlapping image details of the surface of the rotor blade, assembling the images of the sequence to form an overall image of the surface of the rotor blade and automated inspection of the images of the sequence for defects in the surface to detect and localize material defects in the surface of the rotor blade.

Moreover, a measurement system suitable for performing the above mentioned methods is described.

BRIEF DESCRIPTION OF THE DRAWING FIGURES

Figure 2:
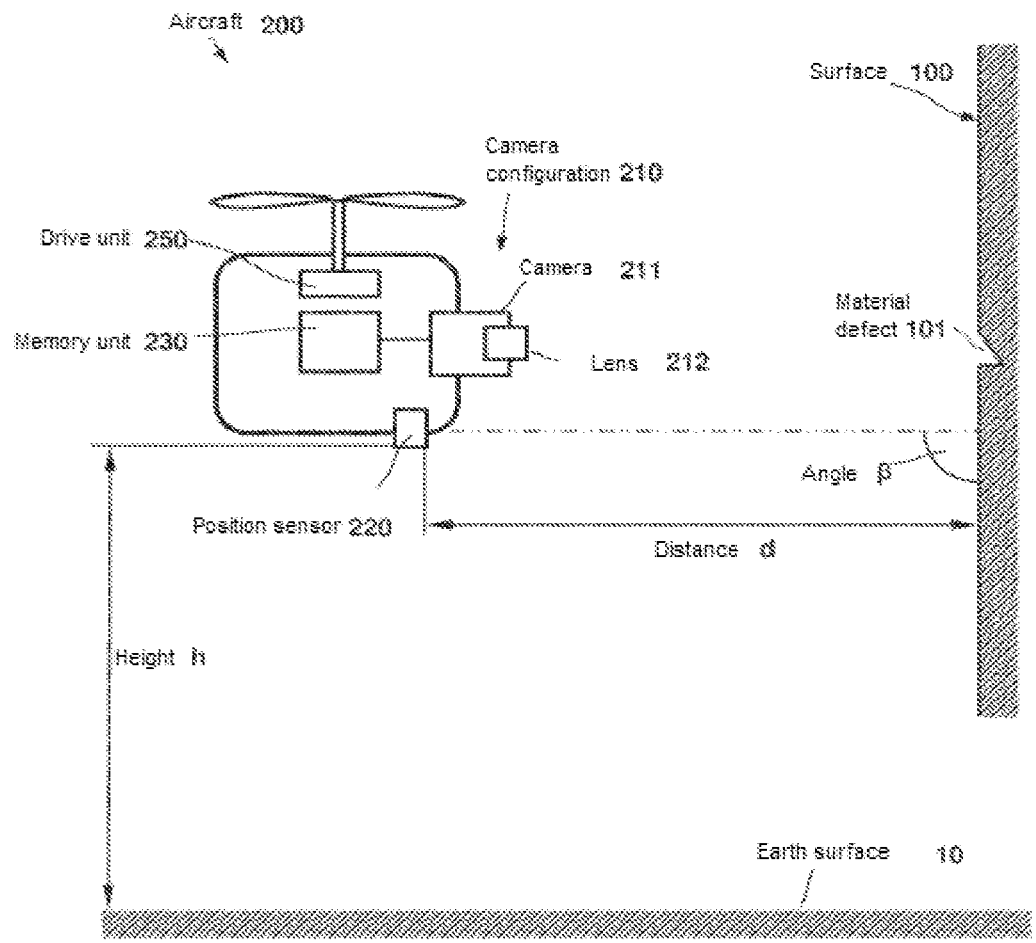
Figure 3:
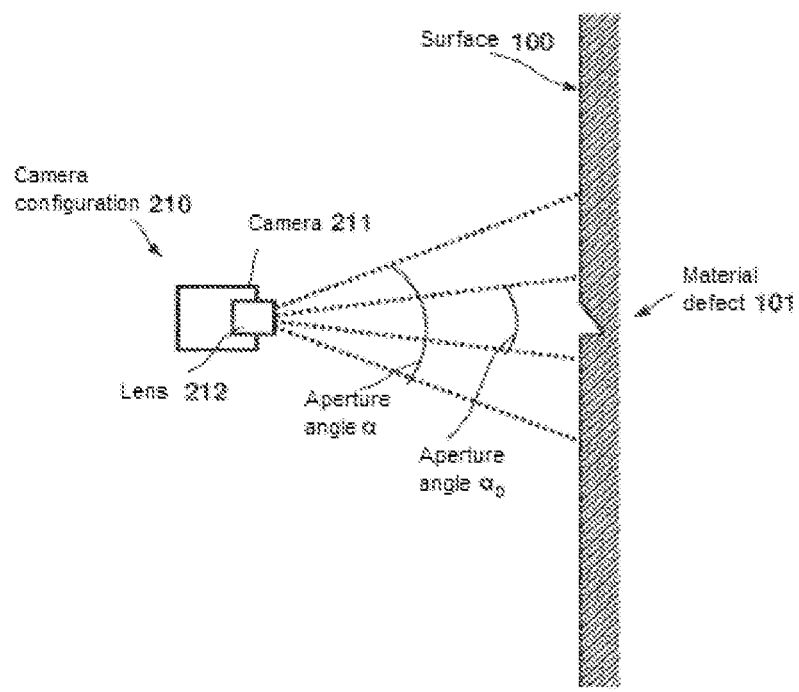
Figure 4:
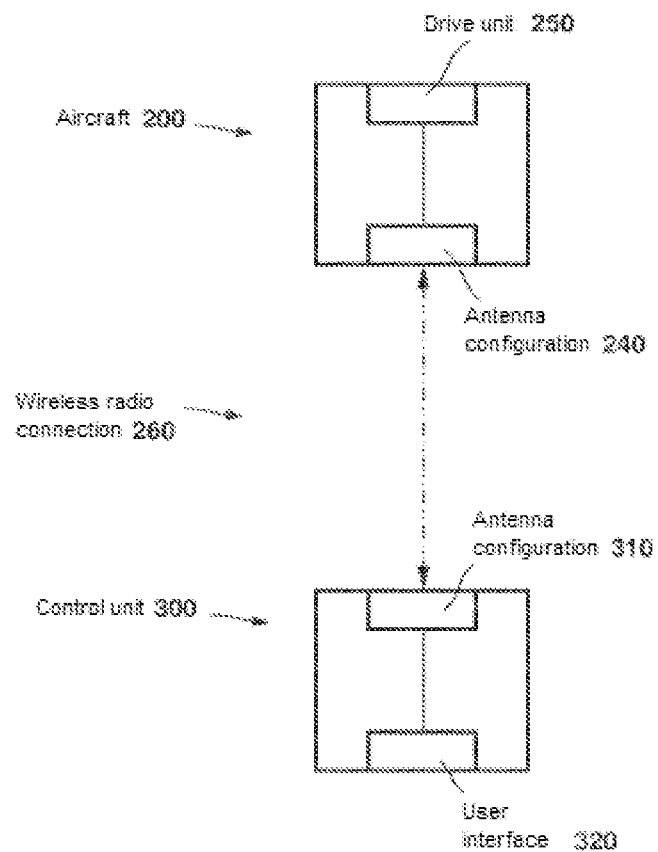
Figure 5:
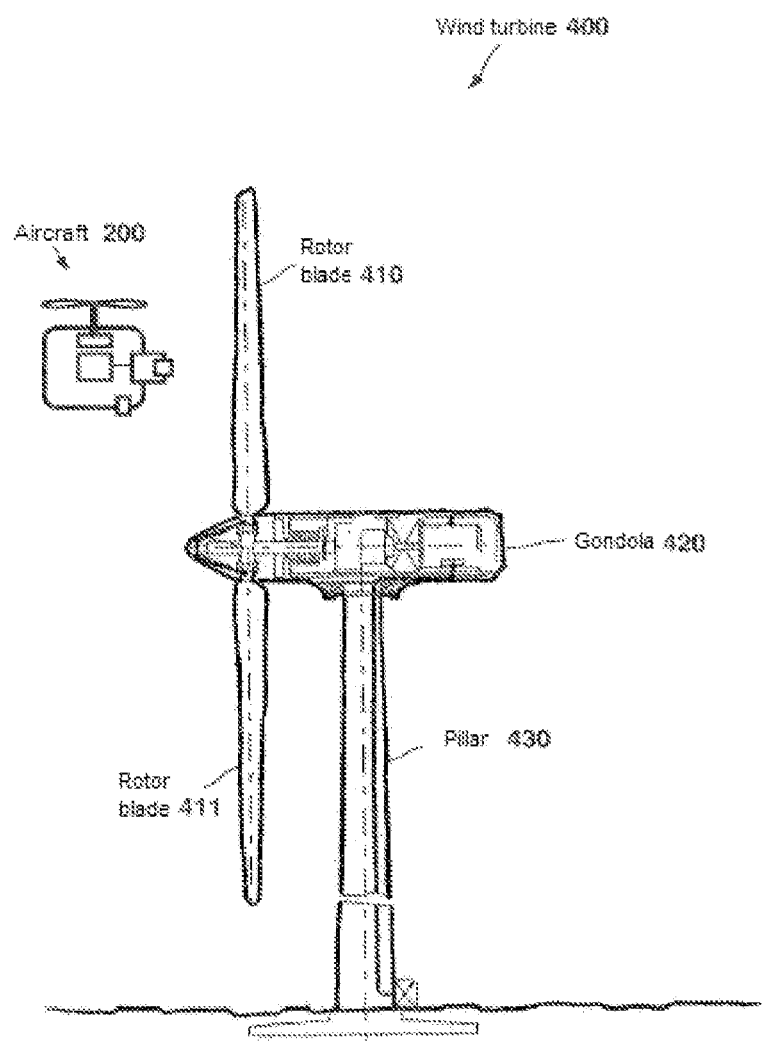

The invention is explained in greater detail below on the basis of exemplary embodiments illustrated in the figures. In the figures, the same reference numerals denote the same or similar components. The components illustrated in the figures are not necessary drawn true to scale in relation to one another; they show:

FIG. 1 a front view of a surface having a material defect, with partially overlapping images of the surface along a flight path of the aircraft, FIG. 2 a side view of a surface and the aircraft with a camera configuration, FIG. 3 a side view of a surface and the camera configuration with various aperture angles, FIG. 4 a block diagram of the aircraft and a control unit and FIG. 5 a wind turbine having rotor blades and an aircraft.

DETAILED DESCRIPTION

FIG. 1 shows a front view of any surface 100. The surface 100 is, for example, a surface that is difficult to access, for example, being located at a great height. This surface 100 may have material defects 101. The material defect 101 illustrated in FIG. 1 may be a crack, for example. According to the invention, at least one first image 121 of the surface 100 to be inspected is recorded. In practice, however, it will often occur that the surface 100 is too large to be detected with sufficient image quality by a single image 121, in particular when the image is recorded by a camera using a telescopic lens. Therefore at least one second image 122 or a sequence 120 of images may be recorded, each representing individual surface sections of the surface 100.

If at least one second image 122, i.e., a sequence 120 of images, is necessary, then the individual images 121, 122 of the sequence 120 may be recorded in such a manner that neighboring images in the overlap regions 123 overlap at least partially. The individual images 121, 122 of the sequence 120 can therefore be assembled almost "seamlessly" by image processing methods to form an overall image 130. To do so, for example, essentially known image stitching methods or some other suitable image processing method may be used. Conversion of the individual images into so-called orthophotos is also possible. An orthophoto is understood to be a distortion-free, true-to-scale image of the surface, which is derived by photogrammetric methods from the images of sequence 120.

To compile the at least one image 121 or the sequence 120 of images, an unmanned autonomously navigating aircraft 200 ("autonomous UAV" or "autonomous unmanned aerial vehicle" which is also known as a "drone") with a camera configuration 210 is used. The aircraft 200 flies, for example, along a flight path 110. This flight path 110 is selected so that the camera configuration 210 of the aircraft 200 can record a sequence 120 of images, resulting in overlap regions 123 between the individual images 121, 122 to achieve an overall image 130.

The aircraft 200 may have a so-called "sense-and-avoid system" (also "see-and-avoid system") for detecting obstacles and for automatic avoidance. Such systems may have a camera configuration 210 having at least one camera as well as distance sensors (e.g., radar sensor or laser scanner). A sense-and-avoid system is described in the publication WO/2010/007115, for example. In the event of an inspection of a wind turbine in a wind farm having a plurality of wind turbines, there are significant advantages to using an autonomously navigating UAV with a sense-and-avoid system because collisions with wind turbines located in the flight path are avoided practically automatically. In particular helicopters, especially quadcopters, are suitable as UAVs.

FIG. 2 shows a side view of the surface 100. The material defect 101 is also shown here. In addition, the aircraft 200 is diagrammed schematically, with the aircraft 200 being situated at the height h above the earth's surface 10 (and/or water surface) and at distance d from the surface 100 to be inspected. The aircraft 200 may maintain a fixed angle β (e.g., 90°) and a fixed (predefinable) distance d from the surface 200 in a suspended state, for example. For the further image processing (e.g., the image stitching mentioned above), it may be advantageous if the images of the sequence are recorded approximately from the same perspective.

The aircraft 200 may have a drive unit 250, a memory unit 230, at least one position sensor 220 and a camera configuration 210. The aircraft 200 may be designed so that it is capable of remaining in a hovering position in relation with the earth's surface 10 and the surface 100 to be inspected. For example, the aircraft 200 may be a VTOL aircraft (VTOL=vertical takeoff and landing). VTOL aircraft are capable of taking off and landing vertically as well as hovering, i.e., remaining airborne in a certain position. The maximum outside dimensions of such an aircraft may be in the range of approximately 2.5 m, for example. Such aircraft may travel over a flight path 110 over the surface 100, for example, wherein the flight path runs at a predefined distance d from the surface 100, and the aircraft maintains a fixed angle to the surface 100. The camera configuration 210 of the aircraft serves to record at least one image 121, 122 or a sequence 120 of images of the surface 100. These images may be stored in the memory unit 230. The position sensor 220 or multiple position sensors may be provided for continuous determination of the height h, the distance d and the angle β, for, example, in predefined clock cycles. The relative position and the orientation of the aircraft 200 in relation to the surface 100 may be determined continuously and regulated as needed. The height h and/or the distance d and/or the elevation angle β and/or the azimuth angle or all these variables may be taken into account in determining the relative position of the aircraft 200. It is also conceivable to include other additional variables that are not listed here, for example, the wind force in determining the relative position. It is often desirable to compensate for the effect of wind force on the aircraft through the control technology. For reasons of energy efficiency, the aircraft can always be rotated in the direction of the wind.

The position sensor 220 may have at least one laser scanner for scanning the surface 100 to measure the distance d from the surface 100 (continuously). Alternatively, radar sensors may also be used. GPS sensors (e.g., in connection with gyro sensors) may be used for the position measurement.

According to the invention it is possible to continuously measure and regulate the relative position of the aircraft 200 and/or the camera configuration 210 anchored therein in relation to the surface. According to one exemplary embodiment the aircraft maintains a predefined distance d (optionally also a fixed angle) from the surface 100. It is therefore also possible to generate a continuous overall image 130 of surfaces having a profile such as, for example, the rotor blades of a wind turbine, in particular when a sequence 120 of images is recorded. The positioning of the aircraft 200 in relation to the surface to be inspected may be supported, for example, by an onboard wind predictor (wind direction and wind force). The respective wind force may be taken into account in the positioning of the aircraft by means of a wind predictor. For example, the aircraft 200 may be navigated in such a way that it is aligned in the direction of the wind in order to optimize energy consumption.

However, it is not absolutely necessary for the aircraft to maintain a predefined distance d and/or a fixed angle β relative to the surface 100. If this is not the case, then the images of the recorded sequence must be scaled and distortion must be removed by image processing. One possibility is to convert the images of the sequence into orthophotos, for example. A 3D reconstruction of the surface is also possible since the relative position of the aircraft 200 is known for each individual image of the sequence recorded.

The at least one image 121 of the surface 100 can be inspected automatically for defects in the surface 100 to detect and localize material defects 101 in the surface. To implement this, the camera configuration 210 of the aircraft 200 has at least one camera 211 with at least one lens 212. According to one embodiment, the camera 211, the camera configuration 210, the lens 212 or all three of these components may be adjustable electrically. To do so, a suitable adjustment means such as electric motors may be provided. In particular the lens 212 may be designed to be adjustable so that the aperture angle α of the lens 212 can be varied (zoom lens). The images or sequence of images may be analyzed on-line or off-line. For example, suitable and known image processing software may be used. Alternatively, however, the analysis may also be performed by visual inspection of the images or of the sequence of images without computer support.

A variable aperture angle α of the lens 212 is provided according to the invention in order to record, on the one hand, images 121, 122 (or a corresponding sequence 120 of images), which overlap in an overlap region 123, and on the other hand, to select the aperture angle as a function of the relative position of the aircraft 200 to the surface 100 (i.e., as a function of the distance) so that a material defect 101, for example, a crack or a hole, can be detected. The aperture angle required for detection of a material defect 101 may be obtained approximately, for example, from the equation:

$$\alpha_0 = \arctan\left(\frac{n \cdot s}{2 \cdot a \cdot d}\right) \qquad \text{(equation 1)}$$

wherein n: the number of pixels in one coordinate direction of the camera area, s: the size of the material defect to be detected, in particular the width of a crack, a: the number of pixels on which the material defect, in particular a crack is to be imaged, and d: the distance of the aircraft and/or the camera (configuration) form the surface.

Equation 1 is derived from geometric observations. The number of pixels "a" on which the material defect 101 is to be imaged may be selected as a>2, for example, because it is advantageous to image the material defect 101 on at least two pixels.

As already mentioned, in particular an autonomously navigating UAV may be considered as the aircraft. According to one example of the invention, the UAV has a sense-and-avoid system for automated detection of obstacles and avoidance. Such a sense-and-avoid system for navigation comprises a camera configuration and a distance sensor. The camera configuration may serve, on the one hand, to scan the surface to be inspected (aircraft in "inspection mode") or, on the other hand, for navigation of the aircraft to fly over the surface from a greater distance (navigation mode), depending on the mode of operation. In the navigation mode (also sense-and-avoid mode), the camera configuration 210 is used to detect obstacles on the flight path of the aircraft which can then be avoided automatically according to certain predefined algorithms. For example, wind turbines (which should not be inspected) or ships that lie in the direct flight path can be avoided automatically and autonomously in this way when flying through a wind farm. When the aircraft 200 reaches the surface to be inspected (e.g., the rotor of the wind turbine to be inspected), then the operating mode is changed from navigation mode to inspection mode, in which material defects on the surface to be inspected can be detected with the help of the aircraft as described above. The camera configuration 210 of the aircraft 200 may have a plurality of individual cameras arranged along an arc of a circle, covering a large field of vision of 220°, for example. In navigation mode, a large field of vision is desirable. In the inspection mode, for example, a camera of the camera configuration may be used to record the above mentioned image sequence of the surface to be inspected.

The camera 211 of the camera configuration 210 may be embodied, for example, as an electrooptical (EO) camera, as a near-infrared (NIR) camera or as an infrared (IR) camera. It is also conceivable to provide several of these types of cameras in the camera configuration 211. In addition, any other suitable types of cameras may also be used.

FIG. 4 schematically shows in a block diagram an aircraft 200 and a respective control unit 300. The aircraft 200 can be controlled by a user by means of a control unit 300. The control unit has essentially a user interface 320 by means of which the user can manually generate control signals for controlling the aircraft 200. According to one embodiment, the control signals may be transmitted to the aircraft 200 over a wireless radio connection 260 by means of an antenna arrangement 310 in the control unit 300 to an antenna arrangement 240 in the aircraft. The antenna arrangement 240 of the aircraft 200 may be connected to the drive unit 250. The drive unit may be designed to keep the aircraft 200 hovering in a certain position and to receive the control signals from the antenna arrangement 240, to process the signals and then to fly over a flight path 110 in accordance with the wishes of the user.

According to the method described above, in inspecting the surface 100, the control of the aircraft 200 may be reduced to a two-dimensional problem because the distance d from the surface 100 is regulated as a constant. A user may in this way control only the position in a plane at a distance d parallel to the surface 100. Furthermore, it is of course also conceivable for the user to adjust the distance manually, for example, by deactivating the control.

FIG. 5 shows a wind turbine 400. Such wind turbines 400 are being used to an increasing extent for generating electricity, for example. A wind turbine consists essentially of a pillar 430 on which a gondola 420 is situated. The gondola 420 contains, for example, the drive train (in particular shafts, gears, generator) of the turbine. Rotor blades 410, 411 are arranged on the gondola. A wind turbine 400 usually has three rotor blades offset by 120°. Wind turbines for generating electricity may have rotor diameters in the range of 130 m, for example. The pillar 430 may thus reach heights of approximately 100 m, for example. The surfaces 100 of the rotor blades 410, 411, of the gondola 420 and of the pillar 430 are thus at a substantial height (up to 150 m above the surface of the earth or the water surface). Rotor blades 410, 411 are exposed to extreme mechanical stresses during operation and therefore must be inspected regularly. The method according to the invention is very suitable for inspection of wind turbines 400 in particular. It is therefore no longer necessary for a person to go to great heights for inspection of the surfaces 100 for material defects 101. In the case of offshore wind turbines in particular, the inspection may be performed automatically with the help of a UAV, and it is no longer necessary to transport humans to the wind turbine at sea.

The method according to the invention may be used advantageously for surface inspection of rotor blades but also on buildings or other surfaces that are difficult to access. Aircraft that can move in the uncontrolled airspace do not require certification at all in many countries or are subject only to limited prerequisites. The controlled air space begins above a minimum flying altitude, which is defined by law (h=150 m in Europe). For safety reasons, "ordinary" aircraft, in particular airplanes, are not allowed at a flying height of less than h=150 m (except for takeoff and landing).

Thus, for the flying device 200 according to the invention, there usually remains only a flight corridor between the ground and a flight altitude of h=150 m in a municipal area, where there are high buildings accordingly, or in wind farms, in particular offshore wind farms, the aircraft 200 therefore cannot usually fly over obstacles but instead must avoid the obstacles in a suitable manner. Additional obstacles which may cross the flight path of the aircraft on the open sea include, for example, container ships, which may protrude out of the water surface. To avoid these obstacles, the aircraft 200 may be operated in the navigation mode mentioned above by flying around obstacles; for example, wind turbines can be detected and avoided (automatically). Thus, the use of the method according to the invention offers the advantage in particular that aircraft not certified for general flying operation can be used in this process.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for inspecting a surface with a known position for material defects using a camera configuration arranged on an unmanned aircraft which is navigated autonomously, comprising:
   automatically flying the unmanned aircraft from a starting location to the surface, wherein during the automatic flying obstacles are avoided using automatic detection of obstacles and avoidance measures;
   continuously measuring a distance between the unmanned aircraft and the surface using at least a distance sensor;
   recording a sequence of images of the surface, wherein the aircraft is moved along a flight path in relation to the surface in such a way that the images of the sequence have at least partially overlapping image details of the surface in overlap regions;
   compiling the recorded sequence of images to form an overall image of the surface; and
   inspecting the surface for defects and a localization of defects using the overall image,
   wherein the distance between the unmanned aircraft and the surface is regulated continuously so that the unmanned aircraft maintains a predefined distance and a predefined orientation in relation to the surface, and the flight path runs essentially parallel to the surface such that the images of the sequence are recorded approximately from the same perspective, wherein the camera configuration has a plurality of individual cameras which are used to navigate the unmanned aircraft and for said recording of the sequence of images of the surface, and wherein the camera configuration is adjustable electrically.

2. The method according to claim 1, wherein the automatic detection of obstacles and automatic avoidance of obstacles is controlled by a sense-and-avoid system of the unmanned aircraft, the sense-and-avoid system is initially in a navigation mode in which in which it flies automatically toward the surface or flies back to the takeoff location, and after flying toward the surface, the sense-and-avoid system is switched to an inspection mode in which images of the surface are recorded.

3. The method according to claim 1, wherein the camera configuration includes at least two cameras that record the sequence of images of the surface.

4. The method according to claim 1, wherein the surface is a rotor blade of a wind turbine.

5. The method according to claim 4, wherein after recording the sequence of images, the unmanned aircraft is flown back to the takeoff location or another rotor blade is approached in flight to record another sequence of images.

6. A system for inspecting a surface with a known position for material defects, wherein the system comprises:

an aircraft with a control unit configured to fly in a navigation mode automatically toward the surface, starting from a takeoff location and to automatically detect obstacles during the flight and to avoid the obstacles; wherein the aircraft comprises a camera configuration and a distance sensor, wherein the distance sensor is configured to determine a distance between the aircraft and the surface after flying toward the surface, wherein the control unit is configured to automatically move the aircraft along a flight path in relation to the surface in an inspection mode and to record a sequence of partially overlapping images of the surface and while doing to measure the distance between the aircraft and the surface corresponding to each image, wherein the images are assembled to form an overall image of the surface in order to permit an inspection of the surface for defects and a localization of defects on the basis of the overall image, wherein the distance between the aircraft and the surface is regulated continuously so that the aircraft maintains a predefined distance and a predefined orientation in relation to the surface, and the flight path runs essentially parallel to the surface such that the images of the sequence are recorded approximately from the same perspective, wherein the camera configuration has a plurality of individual cameras which are used to navigate the aircraft and to record the sequence of images of the surface, and wherein the camera configuration is adjustable electrically.

7. The system according to claim 6, further comprising:

a memory unit arranged in the aircraft and configured to store images recorded by the camera configuration; or a radio module arranged in the aircraft that is configured to transmit images recorded by the camera configuration to a radio receiver.

8. A method for inspecting a surface with known position for material defects using a camera configuration arranged on an aircraft, this method comprising:

flying the aircraft from a takeoff location toward the surface;

continuously measuring a distance between the aircraft and the surface using at least a distance sensor;

recording a sequence of images of the surface; and automatically or visually inspecting the surface for defects and a localization of defects using an overall image created from the sequence of images of the surface, wherein the distance between the aircraft and the surface is regulated continuously so that the aircraft maintains a predefined distance and a predefined orientation in relation to the surface, and the flight path runs essentially parallel to the surface such that the images of the sequence are recorded approximately from the same perspective, wherein the camera configuration has a plurality of individual cameras which are used to navigate the aircraft and for said recording of the sequence of images of the surface, and wherein the camera configuration is adjustable electrically.

9. The method according to claim 8, wherein the surface to be inspected is the surface of a rotor blade of a wind turbine.

* * * * *